United States Patent [19]

Cloeren et al.

[11] Patent Number: 5,582,850
[45] Date of Patent: Dec. 10, 1996

[54] INTERNAL DECKLE POSITION CONTROL

[75] Inventors: Peter F. Cloeren, Orange; Rolf P. Schulz, Bridge City; Richard L. Linam, Orange, all of Tex.

[73] Assignee: The Cloeren Company, Orange, Tex.

[21] Appl. No.: 465,197

[22] Filed: Jun. 5, 1995

Related U.S. Application Data

[63] Continuation of Ser. No. 185,329, Jan. 21, 1994, abandoned, which is a continuation of Ser. No. 967,142, Oct. 27, 1992, abandoned.

[51] Int. Cl.⁶ .................................................. B29C 47/16
[52] U.S. Cl. .......................... 425/381; 264/167; 425/466
[58] Field of Search ...................... 425/466, 381, 425/382.4, 147, 145; 74/337.5; 264/167

[56] References Cited

U.S. PATENT DOCUMENTS

| | | | |
|---|---|---|---|
| 3,018,515 | 1/1962 | Sneddon | 425/466 |
| 3,293,689 | 12/1966 | Chiselko et al. | 425/466 |
| 3,664,207 | 5/1972 | White | 74/337.5 |
| 3,684,422 | 8/1972 | Huesing | 425/466 |
| 3,706,518 | 12/1972 | Bunte et al. | 425/381 |
| 3,711,235 | 1/1973 | Bunte et al. | 425/466 |
| 3,829,274 | 8/1974 | Melead | 425/466 |
| 3,832,120 | 8/1974 | Shaffer | 425/466 |
| 4,248,579 | 2/1981 | Maejima | 425/227 |
| 4,659,302 | 4/1987 | Maejima | 425/190 |

FOREIGN PATENT DOCUMENTS

| | | | |
|---|---|---|---|
| 2092512 | 8/1982 | United Kingdom | 425/466 |
| 2114050 | 8/1983 | United Kingdom . | |

OTHER PUBLICATIONS

Lowell Ratchet Clutches (specification).

*Primary Examiner*—Jay H. Woo
*Assistant Examiner*—Joseph Leyson
*Attorney, Agent, or Firm*—Timothy R. Kroboth

[57] ABSTRACT

An improved extrusion apparatus having an internal deckle, includes a toothed rack and a rotatable gear for positioning the deckle. The apparatus may include an independently adjustable, upstream deckle. A brake mechanism that assists the control of deckle movement, is also provided. A tongue and groove, sliding fit of the deckles may be used.

19 Claims, 3 Drawing Sheets

INTERNAL DECKLE POSITION CONTROL

This application is a continuation of application Ser. No. 08/185,329, filed Jan. 21, 1994, now abandoned, which is a continuation of 07/967,142, filed on Oct. 27, 1992, now abandoned.

BACKGROUND OF THE INVENTION

This invention relates to an improved extrusion apparatus having an internal deckle system.

An extrusion apparatus having deckles defining the web width, is well known. The deckles may be internal, external, or an external/internal combination such as an external boat deckle with internal deckle members. U.S. Pat. No. 3,829,274 to Melead exemplifies an external/internal combination in which a rack and pinion mechanism provides for adjustment of the external boat deckle and for movement of internal deckle rods. In film extrusion, an external deckle member disadvantageously results in a comparatively larger gap between, and limits the relative positioning of, the exit orifice and chill rolls.

U.S. Pat. No. 3,018,515 to Sneddon teaches a two component, internal deckle with external adjustment provided by a hand-turnable nut. One component is provided by a cylindrical head or manifold plug that precisely fits within the manifold, and a fin that joins into the manifold plug and extends downwardly. The bottom of the fin is formed with a semi-cylindrical groove within which a separately adjustable, closure wire fits.

U.S. Pat. No. 4,248,579 to Maejima teaches a two component, internal deckle with geared, external adjustment. A support rod movably disposed within the manifold, and a flag that extends from an end of the support rod into the preland channel, serve as one component, and a downstream deckle rod is the second component. Adjustment is provided by a rotatable shaft in threaded engagement with an internally threaded bore of the support rod.

A problem with prior art, internal deckle systems is the space requirement of external adjustment mechanisms. This problem is of particular importance when retrofitting existing machinery. Interference with chill rolls must be avoided. Moreover, a simplified, efficient adjustment mechanism would be beneficial.

Additionally, facile and easily repeatable adjustment of the internal deckle components is needed. In typical use of prior art adjustment mechanisms, all deckle components are initially moved as a unit to suitably position the deckle rod and set the slot width. Thereafter, the deckle rod is manually held in place, and final adjustment of the remaining deckle component or components is made. However, holding the deckle rod in place while making adjustment of the remaining deckle component or components may be difficult, and the deckle rod may thereafter need to be reset to the proper position.

A further problem is that fluid pressure acting on the inner ends of the deckle components tends to push them outwardly. A friction brake mechanism for preventing deckle components from being forced out of adjustment, must be unlocked and locked to allow deckle repositioning. Therefore, there is a need for an improved brake mechanism.

U.S. Pat. No. 4,659,302 to Maejima teaches a three component, internal deckle provided by an upper deckle portion that includes a manifold plug; an independently movable, lower deckle portion; and a deckle rod. U.S. patent application Ser. No. 915,485, filed on Jul. 17, 1992, describes a three component, internal deckle provided by an upper deckle plug, an independently movable, deckle blade having a leading edge that may be proximate to the mouth of the preland channel, and a deckle rod.

A drawback with a separately moveable, lower deckle is that under normal operating conditions, inward adjustment may be difficult, and in the case of U.S. Pat. No. 4,659,302 to Maejima may result in support rod deflection. Consequently, to effect inward adjustment, users may reduce or stop flow throughput.

A further drawback is that flow pressure at the inner end of a separately moveable, lower deckle may produce downward deflection and contact with the deckle rod. Contact with the deckle rod may hamper positioning of the rod, and may result in premature failure of the rod.

Thus, there continues to be a need for an improved extrusion apparatus that includes an internal deckle system.

SUMMARY OF THE INVENTION

It is accordingly an object of the present invention to provide an extrusion apparatus having an external adjustment mechanism for an internal deckle system, with minimal space requirements.

It is a still further object to provide an extrusion apparatus having a simplified, efficient adjustment mechanism for an internal deckle system.

It is an even further object to provide an extrusion apparatus having an adjustment mechanism that provides for facile and easily repeatable adjustment of the internal deckle components.

It is an additional object to provide an extrusion apparatus having an adjustment mechanism that provides for facile inward movement of a separately moveable, lower deckle.

It is an even additional object to provide an extrusion apparatus having an adjustment mechanism for internal deckle components, with improved means for preventing deckle components from being forced out of adjustment by internal fluid pressure.

It is a still additional object to provide an extrusion apparatus having an internal deckle system that prevents downward deflection of a separately moveable, lower deckle and contact with the deckle rod.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an extrusion apparatus including an internal deckle, and an externally disposed, deckle adjustment system. The deckle adjustment system advantageously includes a movable arm in engagement with the internal deckle, a support arm for the movable arm, a toothed rack on the support arm, and a rotatable gear on the movable arm and in engagement with the toothed rack for movement of the movable arm and positioning of the internal deckle. The rotatable gear may be a pinion on a rotatable shaft.

Beneficially, the internal deckle may be a deckle rod, and the extrusion apparatus further includes an upstream, internal deckle with which the movable arm is engaged and which is positionable independent of the movable arm. To this end, an adjustment bolt that passes through a bore in the movable arm, may be connected to the upstream deckle.

The deckle adjustment system may further advantageously include a brake for further controlling movable arm movement. Preferably, the brake may be a ratchet clutch.

In a further variation, the internal deckle system may include in downstream order, a first deckle member provided with a groove, a second deckle member provided with a corresponding tongue, and a deckle rod. In this variation, the first deckle member and second deckle member are in an interconnected tongue and groove, sliding fit relationship.

In the drawing and detailed description of the invention that follow, there is shown and essentially described only a preferred embodiment of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

DETAILED DESCRIPTION OF THE INVENTION

Figure 1:
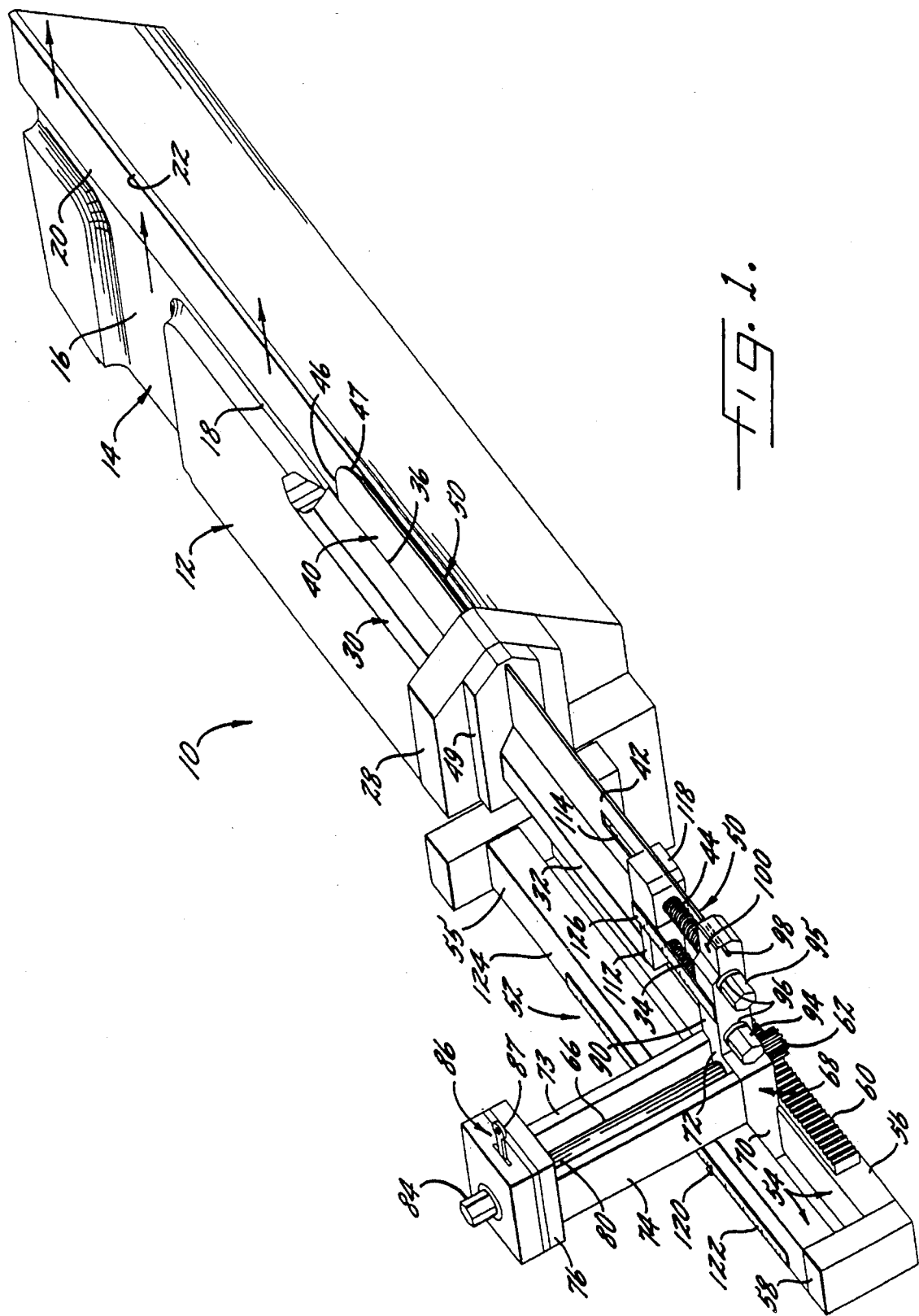
FIG. 1 is an isometric partial view of a preferred embodiment of an extrusion apparatus in accordance with the present invention, with the flow passageway exposed.
Figure 2:
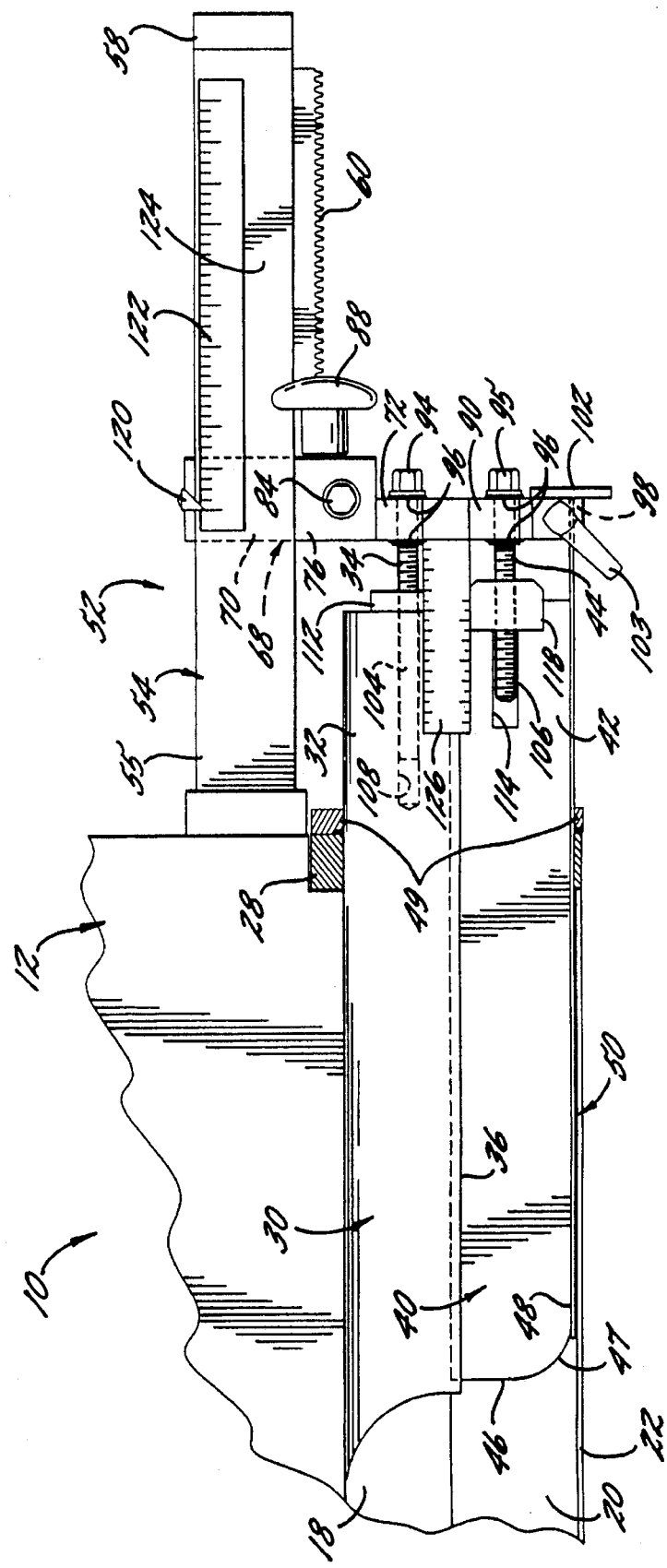
FIG. 2 is a partial plan view of the other end of the apparatus of FIG. 1, showing the internal deckles in approximately a position of full engagement relative to the die body.
Figure 3:
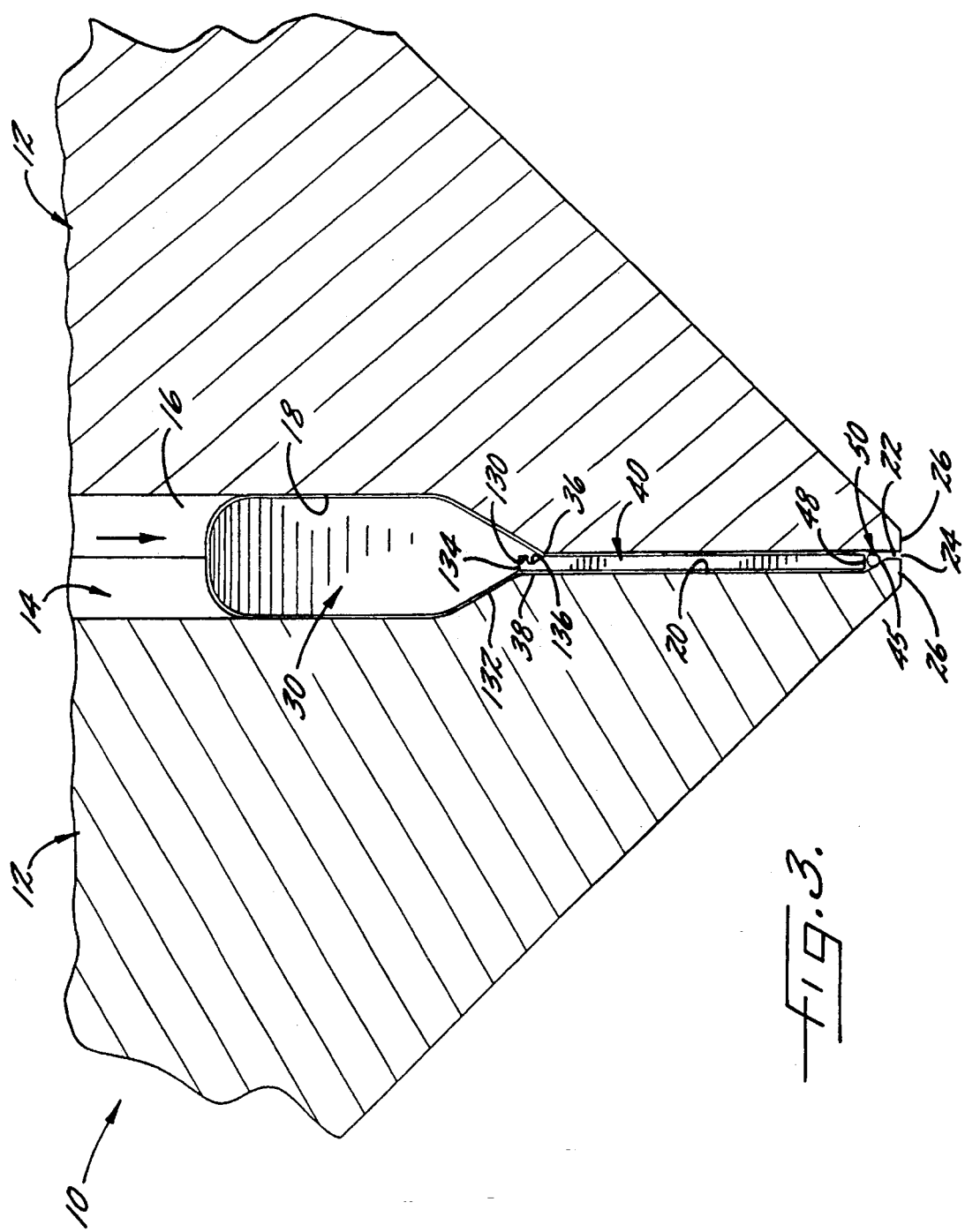
FIG. 3 is an enlarged, cross-sectional view taken along the centerline of the extrusion apparatus of FIG. 1.

As indicated, the present invention is directed to a novel extrusion apparatus including an externally disposed, deckle adjustment mechanism for an internal deckle system. Referring to FIGS. 1 to 3, a preferred embodiment of an extrusion apparatus 10 in accordance with the present invention, is shown. The apparatus includes a main body 12 having a flow passageway 14, which provides for a main direction of flow indicated by arrows. The flow passageway includes in downstream order, a feed channel 16, a transverse flow-providing manifold 18 by which a flow stream is spread widthwise, a preland channel 20, and a land channel 22 that terminates in an exit slot 24 formed by lips 26.

Conveniently, the manifold has a generally rectangular cross-section of substantially constant cross-sectional area from end to end. Alternatively, the manifold cross-section may be generally circular or tear drop-shaped.

Extending through an end plate 28 of main body 12 into the flow passageway, and disposed generally parallel to the exit slot, is an adjustable, upper deckle plug 30 having an outer end 32 to which an adjustment bolt 34 may be advantageously secured. Beneficially, upper plug 30 may be a full width plug. By "full width" is meant for purposes of this description, a transverse dimension of an upper deckle substantially equal to or exceeding the maximum engagement of the deckle in the transverse flow-providing manifold. Generally speaking, maximum engagement will block about 25% of the manifold width.

Advantageously, a trailing edge 36 of plug 30 extends to a diagonally formed mouth 38 of the preland channel, and plug 30 is provided with a size and shape for precision sliding fit relationship with the manifold. When cross-sectionally viewed as in FIG. 3, plug 30 may be seen as generally disposed within the confines of the manifold. For certain applications, plug 30 may not be necessary.

Extending through end plate 28 into the preland channel, and disposed generally parallel to the exit slot, is an independently adjustable, lower deckle plug 40 beneficially in the form of a deckle blade, having an outer end 42 to which an adjustment bolt 44 may be beneficially secured. By the term "deckle blade" is meant for purposes of this description, a generally blade-shaped, deckle member disposed in the preland channel and having a transverse dimension substantially equal to or exceeding the maximum engagement of the member in the preland channel. Generally speaking, maximum engagement will shorten the channel width by about 25%.

Advantageously, the lower deckle plug extends in the main flow direction from the mouth of the preland channel to a transition wall 45 separating the preland channel from the land channel, and is in precision sliding fit relationship with the preland channel. The lower deckle plug beneficially terminates in an inner end 46 having a convexly radiused, downstream corner 47 that provides transition to a trailing edge 48.

To prevent leakage through end plate 28 around deckle plugs 30,40, sealing means 49 are employed. Preferably, the trailing edges of deckle plugs 30,40 are generally parallel to the exit slot.

Also extending through end plate 28 into the preland channel, and disposed generally parallel to the exit slot, is a deckle rod 50. Beneficially, rod 50 is positioned proximate to transition wall 45 and is closely adjacent to the trailing edge of lower deckle plug 40. However, clearance is provided to avoid frictional contact during adjustment of plug 40 or rod 50.

Deckle members 30,40,50 advantageously form a precise sliding fit in flow passageway 14. The fit is such that each presents a surface forming a complete closure of the respective channel portion except for the necessary mechanical clearance.

With particular reference to FIGS. 1 and 2, in supporting connection with deckle members 30,40,50 is an advantageous mechanism 52 for mechanically adjusting the extent of the deckle members within the flow passageway. The adjustment mechanism includes a generally horizontal, support arm 54 beneficially formed by two generally parallel, spaced apart bars 55,56 each rigidly secured to main body 12 at one end and connected at the other end by a connecting member 58.

Secured to an underside of bar 56 of support arm 54 is a toothed rack 60 in engagement with a pinion 62 provided on an end of a rotatable shaft 66 indirectly supported by support arm 54. Directly supported by arm 54 is an assembly arm 68 oriented generally perpendicular to the support arm and having an upper portion 70 provided with a notched area to fit around bar 56 of the support arm so that an outwardly projecting portion of the upper assembly arm rides on and along an upper surface of the support arm. In this way, the assembly arm is supported by and movable along the support arm, with sliding movement of the assembly arm toward or away from the die body being effected by rotation of the pinion in the corresponding direction.

Attached to a face 72 of assembly arm 68 are two spaced apart, bars 73,74 connected by a connecting member 76. Rotatable shaft 66 is disposed between spaced apart bars 73,74, and at the pinion end extends through an aperture in the assembly arm, and at an opposite end 80, extends through an aperture in the connecting member and terminates in a hex head 84 for rotation of pinion 62 by suitable means such as a wrench.

With particular reference to FIG. 1, advantageously fitted over shaft end 80 is a ratchet clutch 86. Clutch 86 includes a gear wheel (not shown) that fits around rotatable shaft 66, a spring-loaded pawl (not shown) for engagement with the gear wheel, and a lever 87 for disengagement of the pawl from the gear wheel.

When lever 87 is in a first position, the pawl will be in engagement with the gear wheel and outward movement of the assembly arm will be blocked. This prevents the assembly arm from being forced out of position by for instance, internal fluid pressure. However, rotation of the shaft by using for instance a wrench on shaft hex head 84, to provide for inward adjustment of the assembly arm, is permitted. Thus, clutch 86 may be beneficially used to allow free inward adjustment of the assembly arm and prevent outward movement of the arm.

The lever can be moved to a second position which disengages the pawl from the gear wheel. This position allows the deckles to spontaneously move outward in response to fluid pressure in the flow passageway or to be repositioned with for instance, a wrench.

In a variation, two spring-loaded pawls may be used and there may be three functional positions of the lever. In one position, both pawls will be in engagement with the gear wheel and rotational movement of the shaft in either direction will be prevented. In a second position, only one pawl will be in engagement and outward movement will be blocked, and so forth.

Referring to FIG. 2, a handbrake 88, which operates a member (not shown) for frictional contact with the rotatable shaft, may be used to prevent rotational movement of the shaft. However, manual unlocking and locking of the brake would be necessitated for moving the assembly arm.

Referring again to FIGS. 1 and 2, a lower portion 90 of the assembly arm may be provided with smooth throughbores through which adjustment bolts 34,44, provided with hex heads 94,95 for engagement by for example, a wrench, pass. Thrust washers 96 prevent lateral movement of the captured bolts with respect to the assembly arm.

With particular reference to FIG. 1, the assembly arm may be provided with a throughbore 98 into which an outer end of deckle rod 50 is inserted, and a set screw 100 may be used to hold the deckle rod in place. With particular reference to FIG. 2, the assembly arm may be provided with a throughbore through which passes rod 50, which may terminate in a T-handle 102 for its removal from the die body. Tightening mechanism 103 in the form of a wing nut, serves the same purpose as the set screw. Other mechanical attachments may be used.

Referring again to FIGS. 1 and 2, ends 104,106 of the bolts engage internal deckles 30,40, respectively. Engagement with deckle 30 is beneficially provided by a bore 108 in the deckle and a threaded bore in alignment therewith provided by a member 112 secured to outer end 32 of the deckle. Similarly, engagement with deckle 40 may be provided by a notch 114 in the deckle and a threaded bore in alignment therewith provided by a member 118 that fits over and is secured to outer end 42 of the deckle.

In this way, deckle members 30,40,50 are fastened to the assembly arm and are movable by a rack and pinion mechanism in a simplified, efficient manner. Mounting of the rack on the support arm and of the pinion on the assembly arm utilizes minimal space, and permits adjustment from the operator side of the die body, thus eliminating the need for an operator to relocate to a position outward of the die width. If desired, a worm gear may be used in place of rotatable shaft 66 and pinion 62.

Moreover, facile adjustment of deckle 30 and deckle 40 independent of each other, and independent of deckle 50 is provided for by rotation of the respective adjustment bolt. Furthermore, deckles 30,40 may be inwardly positioned by linear force exerted against the assembly arm. The independent positioning may be provided by other mechanisms. For example, a rod having a threaded portion may be in fixed attachment to deckle 30 or 40, and a captured, rotatable adjustment member or nut may be provided on the assembly arm. The rod, which may pass through a bore of the assembly arm, would engage internal threads of the rotatable adjustment member. Similarly, a rack and pinion gear mechanism may be used.

Connected to upper portion 70 of the assembly arm is a pointer 120 that cooperates with an indicator scale 122 mounted on a face 124 of bar 55 of the support arm, to indicate true positioning of the deckle rod. As shown in FIG. 2, mounted perpendicular to the assembly arm is a scale 126 for indicating the positions of deckle members 30,40 and for providing repeatability of positioning.

In operation of each end of extrusion apparatus 10, the rack and pinion mechanism is used to move the assembly arm and in particular to simultaneously move deckle members 30,40, 50, connected as described to the assembly arm, until a desired effective slot width is established by deckle rod 50. Thereafter, resin flow through apparatus 10 may be begun. Rotation of adjust bolts 34,44 may then be used to independently adjust the extent of deckle member 30 and to independently adjust the extent of deckle member 40, to reduce edge bead. Adjust bolts 34,44 permit inward movement of the respective deckle members without the need for altering flow throughput and without disturbing the deckle rod position, and in combination with indicator scale 126, provide for precise positioning of the respective deckle members. If desired, the assembly arm may be thereafter moved to re-set the effective slot width while deckles 30,40,50 may remain in fixed position relative to each other, thereby providing a different slot width and edge bead reduction.

Beneficially, deckle rod 50 remains stationary and secure relative to the assembly arm during adjustment of deckle members 30,40. Thus, secure and reliable positioning of the deckle rod is ensured. Moreover, the deckle rod remains at a selected-set point indicated by pointer 120 and indicator scale 122. Hence, scale 122 reflects a true positioning of the deckle rod and the effective slot opening.

In accordance with a further aspect of the present invention best shown in FIG. 3, a groove 130 may be provided in a lower face 132 of deckle 30, and an opposing tongue 134 may be provided on an upper portion of a mating face 136 of independently movable, deckle 40. More precisely, with reference also to FIG. 2, tongue 134 may project from the leading edge of deckle 40 and be generally aligned with the entry to the preland channel. With deckle 30 captive within the boundaries of the manifold and deckle 40 captive in sliding fit contact with deckle 30, deckle 40 is maintained in a generally parallel relationship to the exit slot and prevented from deflecting downward and bearing on deckle rod 50. The tongue and groove, sliding fit of deckle 40 with deckle 30 beneficially overcomes deflection of an independently movable, lower deckle and the negative effect thereof upon the downstream deckle rod.

Having described the invention in detail and by reference to a preferred embodiment thereof, it will be apparent that modifications are possible without departing from the scope of the invention defined in the appended claims. Several modifications have been briefly mentioned for purposes of illustration.

We claim:

1. An extrusion die apparatus comprising a flow passageway comprising a transverse flow-providing manifold and an exit slot; deckle means comprising means for setting the width of said manifold in the form of a first deckle member in sliding engagement with said manifold, and a second deckle member located at least partially within said flow passageway; and a deckle position adjustment system comprising a support arm, a movable arm movably pendent from said support arm and independently connected to said first deckle member and to said second deckle member, and threaded means for exerting force upon said movable arm for positioning said first deckle member independently of movement of said movable arm, said threaded means connecting said first deckle member to said movable arm.

2. The extrusion apparatus of claim 1, wherein said second deckle member is connected to said movable arm by means for positioning said second deckle member independently of movement of said movable arm, said means for independently positioning said second deckle member and said means for independently positioning said first deckle member being separately operable from one another.

3. The apparatus of claim 1, wherein said deckle position adjustment system further comprises a toothed rack on said support arm, and gear means for moving said movable arm in engagement with said toothed rack, and wherein said movable arm comprises a portion that rides on and along said support arm.

4. The apparatus of claim 1, wherein said first deckle member is provided with a groove, said second deckle member is provided with a corresponding tongue, and said first deckle member and said second deckle member are in an interconnected tongue and groove, sliding fit relationship.

5. The apparatus of claim 1, wherein said deckle position adjustment system further comprises means mounted to said movable arm for preventing lateral movement of said threaded means with respect to said movable arm.

6. The apparatus of claim 5, wherein said movable arm is provided with a bore through which said threaded means extends.

7. The apparatus of claim 1, further comprising a body portion comprising said flow passageway, wherein said first deckle member is a full width, deckle plug extending through an end of said body portion into said flow passageway.

8. The apparatus of claim 1, wherein said second deckle member is a deckle rod.

9. An extrusion die apparatus comprising a body portion comprising a flow passageway comprising an exit slot;

deckle means comprising a first deckle member adjustably disposed to change the width of said flow passageway, and a second deckle member located at least partially within said flow passageway, and a deckle position adjustment system comprising a support arm, a movable arm movably pendent from said support arm and independently connected to said first deckle member and to said second deckle member, and threaded means for exerting force upon said movable arm for positioning said first deckle member independently of movement of said movable arm, said threaded means connecting said first deckle member to said movable arm.

10. The extrusion apparatus of claim 9, wherein said second deckle member is connected to said movable arm by means for positioning said second deckle member independently of movement of said movable arm, said means for independently positioning said second deckle member and said means for independently positioning said first deckle member being separately operable from one another.

11. The apparatus of claim 9, wherein said deckle position adjustment system further comprises a toothed rack on said support arm, and gear means for moving said movable arm in engagement with said toothed rack, and wherein said movable arm comprises a portion that rides on and along said support arm.

12. The apparatus of claim 9, wherein said deckle position adjustment system further comprises means mounted to said movable arm for preventing lateral movement of said threaded means with respect to said movable arm.

13. The apparatus of claim 12, wherein said movable arm is provided with a bore through which said threaded means extends.

14. The apparatus of claim 9, wherein said second deckle member is a deckle rod disposed downstream of said first deckle member.

15. An extrusion die apparatus comprising a flow passageway, a deckle member located at least partially within said flow passageway and in operative engagement with a deckle position adjustment system comprising a support arm, a movable arm movably pendent from said support arm and connected to said deckle member for positioning said deckle member relative to said flow passageway, gear means for moving said movable arm, and control means for preventing said movable arm from being positionally displaced by flow pressure exerted upon said deckle member, yet permitting sliding inward positioning of said deckle member relative to said flow passageway, said control means being an engageable and disengageable device in the form of a clutch, said clutch being connected to said gear means.

16. The apparatus of claim 15, wherein said clutch is a ratchet clutch.

17. The apparatus of claim 15, wherein said deckle position adjustment system further comprises a toothed rack on said suuport arm, wherein said gear means is in engagement with said toothed rack.

18. The apparatus of claim 15, wherein said movable arm is connected to said deckle member by means for positioning said deckle member independently of movement of said movable arm.

19. An extrusion apparatus comprising a flow passageway, deckle position adjustment means operatively connected to a deckle system comprising a movable, first deckle member provided with a groove, and a movable, second deckle member provided with a corresponding tongue, said first deckle member and said second deckle member being movable within said flow passageway and relative to each other; wherein said first deckle member and said second deckle member are in an interconnected tongue and groove, sliding fit relationship.

\* \* \* \* \*